US012769332B2

(12) United States Patent
He et al.

(10) Patent No.: US 12,769,332 B2
(45) Date of Patent: Oct. 20, 2026

(54) CLEANING PATH DETERMINATION METHOD AND SYSTEM, AND DEVICE AND STORAGE MEDIUM

(71) Applicant: ECOVACS ROBOTICS CO., LTD., Suzhou (CN)

(72) Inventors: Min He, Suzhou (CN); Rong Chen, Suzhou (CN); Minquan Ding, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 111 days.

(21) Appl. No.: 18/677,493

(22) Filed: May 29, 2024

(65) Prior Publication Data

US 2024/0310856 A1 Sep. 19, 2024

Related U.S. Application Data

(63) Continuation of application No. PCT/CN2022/137341, filed on Dec. 7, 2022.

(30) Foreign Application Priority Data

Dec. 10, 2021 (CN) ........................ 202111510066.1

(51) Int. Cl.
*G05D 1/648* (2024.01)
*A47L 1/02* (2006.01)
(Continued)

(52) U.S. Cl.
CPC .............. *G05D 1/6484* (2024.01); *A47L 1/02* (2013.01); *G05D 1/241* (2024.01);
(Continued)

(58) Field of Classification Search
CPC ................. G05D 1/6484; G05D 1/241; G05D 2105/10; G05D 2109/15; G05D 2107/40;
(Continued)

(56) References Cited

U.S. PATENT DOCUMENTS 5,548,511 A * 8/1996 Bancroft .............. G05D 1/0221 15/340.1
5,568,589 A * 10/1996 Hwang ............... A47L 11/4011 706/900

(Continued)

FOREIGN PATENT DOCUMENTS

CN 206822588 U 1/2018
CN 108309139 A 7/2018

(Continued)

OTHER PUBLICATIONS

International Search Report dated Feb. 14, 2023 as received in Application No. PCT/CN2022/137341.

(Continued)

*Primary Examiner* — Bhavesh V Amin
(74) *Attorney, Agent, or Firm* — Maschoff Brennan

(57) ABSTRACT

The application discloses a method, system, device, and storage medium for determining a cleaning path. The method includes: in response to a cleaning instruction from a cleaning robot, controlling the cleaning robot to rotate a preset angle on the surface to be cleaned based on a target rotation direction; detecting whether the cleaning robot generates a first edge corner trigger signal during its rotation; and determining a working path of the cleaning robot on a surface to be cleaned based on the detecting result of the first edge corner trigger signal. This application automatically determines the working path based on the detecting result of the first edge corner trigger signal, which, compared to existing technologies that rely on manually selecting the working path, ensures the adaptability of the working path to the surface to be cleaned.

17 Claims, 6 Drawing Sheets

(51) Int. Cl.
*G05D 1/241* (2024.01)
*G05D 105/10* (2024.01)
*G05D 109/15* (2024.01)

(52) U.S. Cl.
CPC ...... *A47L 2201/04* (2013.01); *G05D 2105/10* (2024.01); *G05D 2109/15* (2024.01)

(58) Field of Classification Search
CPC .......... A47L 1/02; A47L 2201/04; A47L 9/28; A47L 11/40; A47L 11/4011; A47L 11/4061; G01C 21/00; Y02E 10/50
See application file for complete search history.

(56) References Cited

U.S. PATENT DOCUMENTS

| | | | | |
|---|---|---|---|---|
| 5,720,077 | A * | 2/1998 | Nakamura .......... | A47L 11/4061 15/325 |
| 7,761,954 | B2 * | 7/2010 | Ziegler ................... | A47L 11/02 15/340.1 |
| 9,445,702 | B2 * | 9/2016 | Ziegler ................... | A47L 11/02 |
| 11,069,082 | B1 * | 7/2021 | Ebrahimi Afrouzi ... | G01S 17/48 |
| 11,576,543 | B2 * | 2/2023 | Afrouzi ................. | A47L 9/0472 |
| 11,915,475 | B2 * | 2/2024 | Joo ........................ | G01B 11/25 |
| 12,478,229 | B2 * | 11/2025 | Wu ........................... | A47L 1/02 |
| 2004/0204792 | A1 * | 10/2004 | Taylor ................... | A47L 9/2805 700/245 |
| 2005/0000543 | A1 * | 1/2005 | Taylor .................. | G05D 1/0219 134/18 |
| 2005/0010331 | A1 * | 1/2005 | Taylor .................. | G05D 1/0219 318/568.12 |
| 2005/0171644 | A1 * | 8/2005 | Tani ........................ | A47L 9/009 701/25 |
| 2005/0236021 | A1 * | 10/2005 | Suzuki ................... | A01G 27/00 134/198 |
| 2005/0273967 | A1 * | 12/2005 | Taylor ....................... | A47L 5/28 15/319 |
| 2006/0020369 | A1 * | 1/2006 | Taylor ..................... | A47L 9/009 318/568.12 |
| 2006/0074532 | A1 * | 4/2006 | Hong ................... | G05D 1/0231 701/28 |
| 2007/0016328 | A1 * | 1/2007 | Ziegler ................... | A47L 11/02 318/609 |
| 2008/0191653 | A1 * | 8/2008 | Han .......................... | A47L 9/00 701/25 |
| 2009/0301522 | A1 * | 12/2009 | Abehasera ............ | E04H 4/1654 134/18 |
| 2011/0098853 | A1 * | 4/2011 | Park ..................... | G05D 1/0219 700/250 |
| 2011/0125324 | A1 * | 5/2011 | Baek .................... | G05D 1/0219 700/258 |
| 2011/0271469 | A1 * | 11/2011 | Ziegler ................... | A47L 11/02 901/1 |
| 2014/0034084 | A1 | 2/2014 | Ryu et al. | |
| 2014/0100736 | A1 * | 4/2014 | Kim .................... | A47L 11/4011 15/49.1 |
| 2017/0325647 | A1 * | 11/2017 | Kwak ..................... | A47L 9/009 |
| 2018/0059681 | A1 * | 3/2018 | Kuhara ................. | A47L 9/2852 |
| 2018/0149753 | A1 * | 5/2018 | Shin ...................... | G01S 7/4817 |
| 2019/0061156 | A1 * | 2/2019 | Li ............................. | A47L 1/00 |
| 2020/0027336 | A1 * | 1/2020 | Cho ...................... | A47L 9/2857 |
| 2020/0069134 | A1 * | 3/2020 | Ebrahimi Afrouzi ........................ | A47L 9/0472 |
| 2020/0331148 | A1 * | 10/2020 | Zhang ................. | A47L 11/4011 |
| 2021/0041888 | A1 * | 2/2021 | Okazaki .............. | A47L 11/4011 |
| 2021/0089040 | A1 * | 3/2021 | Ebrahimi Afrouzi ........................ | A47L 11/4011 |
| 2021/0216070 | A1 * | 7/2021 | VanKampen ......... | A47L 9/2805 |
| 2021/0331315 | A1 * | 10/2021 | Park ....................... | B25J 9/1676 |
| 2021/0373570 | A1 * | 12/2021 | Joo ........................ | G01B 11/25 |
| 2021/0405650 | A1 * | 12/2021 | Eoh .......................... | B25J 11/00 |
| 2022/0066456 | A1 * | 3/2022 | Ebrahimi Afrouzi ........................ | A47L 9/0477 |
| 2022/0192444 | A1 * | 6/2022 | Wu ........................... | A47L 1/02 |
| 2023/0180988 | A1 * | 6/2023 | Shin ...................... | A47L 11/282 134/6 |
| 2023/0409040 | A1 * | 12/2023 | Dai ...................... | G05D 1/0214 |
| 2024/0310856 | A1 * | 9/2024 | He ............................ | A47L 1/02 |

FOREIGN PATENT DOCUMENTS

| | | | |
|---|---|---|---|
| CN | 108720709 | A | 11/2018 |
| CN | 109129499 | A | 1/2019 |
| CN | 111839328 | A | 10/2020 |
| CN | 110558891 | B | 5/2021 |
| JP | 2020-000356 | A | 1/2020 |
| WO | 2018/056492 | A1 | 3/2018 |

OTHER PUBLICATIONS

EP Office Action dated Jan. 5, 2026 in application No. 22903538.1.

* cited by examiner

CLEANING PATH DETERMINATION METHOD AND SYSTEM, AND DEVICE AND STORAGE MEDIUM

CROSS-REFERENCE

This application is a Continuation Application of International Patent Application No. PCT/CN2022/137341, filed on Dec. 7, 2022, which is based on and claims priority to and benefits of Chinese Patent Application No. 202111510066.1, filed on Dec. 10, 2021. All of the above-referenced applications are hereby incorporated by reference in their entirety into this application.

TECHNICAL FIELD

This application relates to the field of smart home technology, specifically to a method, system, device, and storage medium for determining a cleaning path.

BACKGROUND

Window cleaning robots are a type of smart home appliance that can firmly adhere to glass surfaces using vacuum pumps or fan devices at their base. They then utilize artificial intelligence to automatically detect the edges and corners of windows and plan a window cleaning path (i.e., a working path). Window cleaning robots typically use the suction force on the glass to move the cleaning cloth at their base to remove dirt from the glass.

Currently, there are generally two types of cleaning paths for window cleaning robots: one follows a horizontal wiping motion, forming a Z-shaped cleaning path, and the other follows a vertical wiping motion, forming an N-shaped cleaning path. Because vertical wiping requires the robot to overcome its own weight and move upward, making it more laborious and prone to slipping, most existing window cleaning robots default to using a horizontal wiping path. To clean the edges and corners of windows in accordance with the shape of the window, window cleaning robots are usually designed with a square structure. If a horizontal wiping path is used on narrow glass, the robot's structural design may prevent it from rotating to change direction on the narrow glass. In this case, a vertical wiping path must be used. Moreover, even if the window cleaning robot can rotate to change direction on narrow glass, using a horizontal wiping path would require frequent direction changes to continue cleaning downward, making the cleaning efficiency much lower than that of using a vertical wiping path.

Therefore, in existing technology, users need to adjust the cleaning path of the window cleaning robot based on the size and specifications of the window before use. If the user forgets to adjust the cleaning path or selects a cleaning path that is not suitable for the structure of the window to be cleaned, it may cause the window cleaning robot to malfunction or work inefficiently.

SUMMARY

This application provides a method, system, device, and storage medium for determining a cleaning path, aiming to solve the problem in existing technology where the cleaning path of a cleaning robot does not match the structure of the surface to be cleaned, causing the cleaning robot to malfunction or work inefficiently.

In its first aspect, this application provides a method for determining a cleaning path, which includes: in response to a cleaning command for the cleaning robot, controlling the cleaning robot to rotate a preset angle on the surface to be cleaned based on a target rotation direction; during the rotation of the cleaning robot, detecting whether the cleaning robot generates a first edge corner trigger signal; based on the detecting result of the first edge corner trigger signal, determining the working path of the cleaning robot on the surface to be cleaned.

In a possible embodiment of this application, before controlling the cleaning robot to rotate based on the target rotation direction, the method includes: obtaining the initial orientation of the cleaning robot on the surface to be cleaned; determining the target rotation direction based on the initial orientation.

In another possible embodiment of this application, before controlling the cleaning robot to rotate based on the target rotation direction, the method includes: controlling the cleaning robot to rotate back to a correct position, so that the cleaning robot rotates from its current orientation to a first preset orientation, which is considered as the initial orientation of the cleaning robot.

In another possible embodiment of this application, obtaining the initial orientation of the cleaning robot on the surface to be cleaned includes: acquiring a posture signal of the cleaning robot; based on the posture signal, determining the initial orientation of the cleaning robot on the surface to be cleaned.

In another possible embodiment of this application, detecting whether the cleaning robot generates a first edge corner trigger signal during its rotation includes: if, during its rotation, the cleaning robot exposes or touches the edge of the surface to be cleaned, then it is detected that the cleaning robot generates a first edge corner trigger signal; otherwise, it is detected that the cleaning robot does not generate a first edge corner trigger signal.

In one possible embodiment of this application, based on the detecting results of the first edge corner trigger signal, the working path of the cleaning robot on the surface to be cleaned is determined, including: if the first edge corner trigger signal is not detected, then it is determined that the working path of the cleaning robot on the surface to be cleaned is a horizontal sweeping path.

In one possible embodiment of this application, based on the detecting results of the first edge corner trigger signal, the working path of the cleaning robot on the surface to be cleaned is determined, including: if the first edge corner trigger signal is detected, then control the cleaning robot to move based on a preset motion trajectory according to the positioning of the first edge corner trigger signal, and at the same time detect whether a second edge corner trigger signal is generated during the movement of the cleaning robot. Based on the detecting results of the second edge corner trigger signal, the working path of the cleaning robot on the surface to be cleaned is determined.

In one possible embodiment of this application, based on the positioning of the first edge corner trigger signal, control the cleaning robot to move based on a preset motion trajectory, and at the same time detect whether a second edge corner trigger signal is generated during the movement of the cleaning robot. Based on the detecting results of the second edge corner trigger signal, the working path of the cleaning robot on the surface to be cleaned is determined, including: if the positioning of the first edge corner trigger signal is at the head of the cleaning robot, then control the cleaning robot to move vertically downwards a preset first distance on the surface to be cleaned; if a second edge corner trigger signal is detected during the movement, then it is determined that the cleaning robot cannot work on the surface to be cleaned, and corresponding alarm information is issued.

In one possible embodiment of this application, the cleaning robot is controlled to move based on a preset motion trajectory according to the positioning control signal of the first edge corner trigger, while simultaneously detecting whether a second edge corner trigger signal is generated during the movement of the cleaning robot. Based on the detecting result of the second edge corner trigger signal, the working path of the cleaning robot on the surface to be cleaned is determined, including: if the positioning of the first edge corner trigger signal is at the head of the cleaning robot, then the cleaning robot is controlled to move vertically downward a preset first distance on the surface to be cleaned; if a second edge corner trigger signal is not detected during the movement, then the cleaning robot is controlled to rotate a preset angle based on the target rotation direction and the opposite direction of the target rotation direction, respectively, and to detect whether a fourth corner trigger signal is generated during the two rotation processes; if a fourth corner trigger signal is detected during both rotation processes, then it is determined that the working path of the cleaning robot on the surface to be cleaned is a vertical sweeping path; otherwise, it is determined that the working path of the cleaning robot on the surface to be cleaned is a horizontal sweeping path.

In one possible embodiment of this application, according to the positioning control of the first edge corner trigger signal, the cleaning robot is controlled to move based on a preset motion trajectory, while simultaneously detecting whether a second edge corner trigger signal is generated during the movement of the cleaning robot. Based on the detecting result of the second edge corner trigger signal, the working path of the cleaning robot on the surface to be cleaned is determined, including: if the positioning of the first edge corner trigger signal is on one side of the cleaning robot, then the cleaning robot is controlled to move vertically downward a preset second distance on the surface to be cleaned, then rotate around its own center point in the opposite direction of the said target rotation direction, or rotate around its own center point in the opposite direction of the target rotation direction and perform walking movement, until the angle between the current orientation of the cleaning robot and the vertically downward direction exceeds a preset angle threshold; if a second edge corner trigger signal is not detected during the movement, then it is determined that the working path of the cleaning robot on the surface to be cleaned is a horizontal sweeping path.

In one possible embodiment of this application, based on the detecting results of the second edge corner trigger signal, the working path of the cleaning robot on the surface to be cleaned is determined. This includes: if the second edge corner trigger signal is detected during the movement, and the positioning of this second edge corner trigger signal is on another side of the cleaning robot, then the working path of the cleaning robot on the surface to be cleaned is determined to be a vertical sweeping path.

In one possible embodiment of this application, the method further includes controlling the cleaning robot to rotate on the surface to be cleaned based on a target rotation direction. Prior to this, the method includes: controlling the cleaning robot to rotate from its current orientation to a second preset orientation; detecting whether the cleaning robot generates a third corner trigger signal during its rotation; based on the detecting results of the third corner trigger signal, the working path of the cleaning robot on the surface to be cleaned is determined.

In one possible embodiment of this application, based on the detecting results of the third corner trigger signal, the working path of the cleaning robot on the surface to be cleaned is determined. This includes: if the third corner trigger signal is detected, and the positioning of this third corner trigger signal is on both sides of the cleaning robot, then the working path of the cleaning robot on the surface to be cleaned is determined to be a horizontal sweeping path.

Secondly, this application also provides a path determination system, which includes: a rotation control unit, for controlling the cleaning robot to rotate a preset angle on the surface to be cleaned based on a target rotation direction in response to a cleaning instruction; a signal detecting unit, for detecting whether the cleaning robot generates a first edge corner trigger signal during its rotation; a path determination unit, for determining the working path of the cleaning robot on the surface to be cleaned based on the detecting results of the first edge corner trigger signal.

Thirdly, this application also provides a path determination device, which includes a memory and a processor. The memory is for storing computer programs, which, when executed by the processor, implement the following functions: controlling the cleaning robot to rotate on the surface to be cleaned based on a target rotation direction in response to a cleaning instruction; detecting whether the cleaning robot generates a first edge corner trigger signal during its rotation; determining the working path of the cleaning robot on the surface to be cleaned based on the detecting results of the first edge corner trigger signal.

Fourthly, this application also provides a computer-readable storage medium, which stores computer instructions. When executed by a processor, these instructions implement the steps of the cleaning path determination method described in the first aspect.

From the content provided, the following beneficial effects of this application can be derived:

In this application, in response to a cleaning instruction for the cleaning robot, the robot is controlled to rotate based on a target rotation direction, and during the rotation process, it is detected whether a first edge corner trigger signal is generated. Finally, the working path of the cleaning robot is determined based on the detecting results. Since whether a first edge corner trigger signal is generated can reflect the size specifications of the surface to be cleaned, this application automatically determines the working path based on the detecting results of the first edge corner trigger signal. Compared to existing technologies that rely on manual selection of the working path, this ensures the compatibility of the working path with the surface to be cleaned, guarantees the normal operation of the cleaning robot, improves the efficiency and cleaning effect of the cleaning robot, and enhances the reliability of the cleaning robot.

BRIEF DESCRIPTION OF DRAWINGS

To more clearly illustrate the technical solutions in this application, the following provides a brief introduction to the drawings necessary for the description of this application. It is evident that the drawings described below are only some embodiments of this application. For those skilled in the art, other drawings can be derived from these without creative effort.

DETAILED DESCRIPTION

Figure 1:
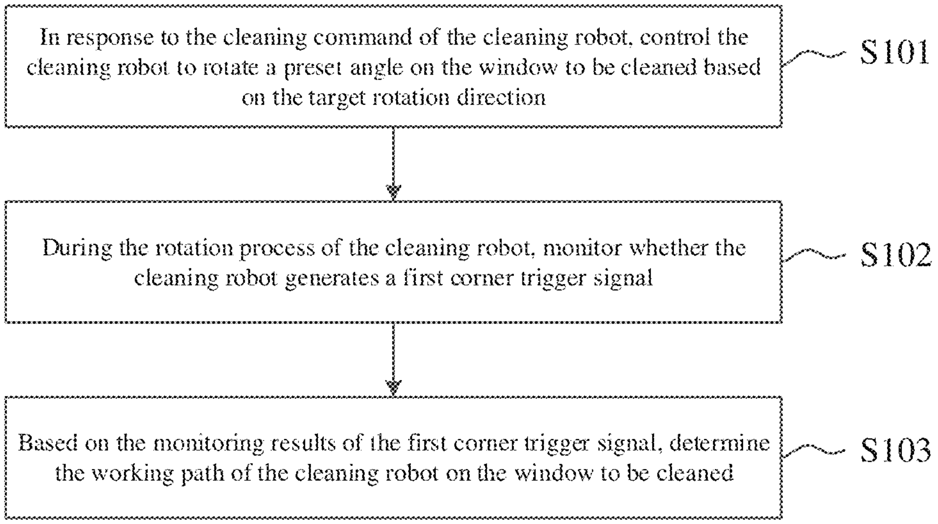
FIG. 1 is a flowchart illustrating a cleaning path determination method provided in an embodiment of this application.

The following will clearly and completely describe the technical solutions in this application in conjunction with the drawings attached to this application. It is evident that the embodiments described here are only a part of the embodiments of this application and not all of them. Based on the embodiments in this application, all other embodiments obtained by those skilled in the art without creative efforts fall within the scope of protection of this application.

In the description of this application, it is necessary to understand that the terms “center,” “length,” “width,” “thickness,” “upper,” “lower,” “front,” “back,” “left,” “right,” “vertical,” “horizontal,” “top,” “bottom,” “inner,” “outer,” and other directional or positional terms are based on the orientations or positions shown in the drawings. They are only for the convenience of describing this application and simplifying the description, and do not indicate or imply that the devices or elements referred to must have a specific orientation, be constructed and operated in a specific orientation, and therefore should not be understood as a limitation of this application. Moreover, the terms “first,” “second” are only for descriptive purposes and should not be understood as indicating or implying relative importance or implicitly indicating the quantity of the technical features indicated. Hence, features defined with “first,” “second” can explicitly or implicitly include one or more of such features. In the description of this application, “multiple” means two or more unless otherwise specifically defined.

In this application, the term “exemplary” is used to mean “serving as an example, illustration, or explanation.” Any embodiment described as “exemplary” in this application should not necessarily be interpreted as preferred or advantageous over other embodiments. The following description is provided to enable any person skilled in the art to implement and use this application. For the purposes of explanation, details are listed in the following description. It should be understood that ordinary artisans in the field can realize the application without these specific details. In other instances, well-known structures and processes are not described in detail to avoid unnecessarily obscuring the description of this application. Therefore, this application is not intended to be limited to the embodiments shown, but is to be accorded the widest scope consistent with the principles and features disclosed herein.

This application provides a method, system, device, and storage medium for determining a cleaning path, each of which is explained in detail below.

Firstly, this application introduces a method for determining a cleaning path. The execution subject of this cleaning path determination method can be a cleaning path determination system, and the method can be applied to intelligent devices with cleaning functions, such as cleaning robots. In the embodiments of this application, the cleaning robot can be used for cleaning glass surfaces, marble media walls, tiles, etc. Taking the cleaning of window glass as an example, the method for determining the cleaning path includes:

In response to the cleaning instruction of the cleaning robot, controlling the cleaning robot to rotate a preset angle based on a target rotation direction on the window to be cleaned; during the rotation process of the cleaning robot, detecting whether the cleaning robot generates a first edge corner trigger signal; based on the detecting result of the first edge corner trigger signal, determining the working path of the cleaning robot on the window to be cleaned.

As shown in FIG. 1, FIG. 1 is a flowchart illustrating a method for determining a cleaning path provided in the embodiment of this application. It should be noted that although a logical order is shown in the flowchart, in some cases, the steps shown or described can be executed in a different order than presented here. The method for determining the work path may include the following steps:

Step S101: In response to the cleaning instruction of the cleaning robot, control the cleaning robot to rotate a preset angle on the window to be cleaned based on a target rotation direction.

It is understandable that, in the embodiments of this application, the cleaning instruction for the cleaning robot can be sent to the cleaning robot by the user via a communication network to start the operation of the cleaning robot.

In the embodiments of this application, the user can control the operation of the cleaning robot through a terminal device. Specifically, the terminal device can be a mobile terminal, computer terminal, dedicated remote control, universal remote control, etc. The terminal device can communicate with the cleaning robot via any communication method, including but not limited to mobile communications based on the 3rd Generation Partnership Project (3GPP), Long Term Evolution (LTE), Worldwide Interoperability for Microwave Access (WiMAX), etc.

As the target rotation direction pertains to the cleaning robot's rotation direction on the window to be cleaned, it can be understood that the direction of rotation on a plane can be either to the left or to the right. Therefore, in the embodiments of this application, the target rotation direction can be either to the left or to the right. This target rotation direction can be a specific rotation direction included in the cleaning command sent by the user to the cleaning robot, or it can be a default rotation direction pre-configured for the cleaning robot during its initial setup. Additionally, it can be a rotation direction deduced by the cleaning robot based on its current posture.

Controlling the cleaning robot to rotate based on the target rotation direction can involve using the robot's own center point as the pivot for rotation, controlling the robot's body to rotate around this pivot point. Given that the robot's body is typically designed as a square structure to accommodate the shape of windows, when the robot's body rotates around its own center point, it is equivalent to drawing a circle with the robot's diagonal length as the diameter, centered on this point. Therefore, the diagonal length of the cleaning robot's body represents the minimum width required for the robot to rotate.

When the width of the window to be cleaned is greater than or equal to the diagonal length of the cleaning robot's body, it can be ensured that the cleaning robot can rotate on the window to change direction. However, if the width of the window is less than the diagonal length of the robot's body, then the robot cannot rotate to change direction on that window.

Step S102 involves detecting during the rotation of the cleaning robot whether the cleaning robot generates a first edge corner trigger signal.

In the embodiments of this application, to detect whether the cleaning robot can rotate on the window to change direction, multiple detectors can be placed at the corners of the robot's body, i.e., at the points where the top meets the sides/edges. For example, these detectors can be pressure sensors, ball head sensors, button sensors, etc.

During the rotation or operation of the cleaning robot, the aforementioned detectors are always in a state of detection. Once a detector is triggered under certain conditions, it generates a first edge corner trigger signal in response to those conditions. This first edge corner trigger signal represents the relative position between the cleaning robot and the window to be cleaned during the rotation or operation process.

Step S103 involves determining the working path of the cleaning robot on the window to be cleaned based on the detecting results of the first edge corner trigger signal.

From Step S102, it is understood that the generation of the first edge corner trigger signal is based on detectors that meet the triggering conditions. Therefore, in the embodiments of this application, the detecting results of the first edge corner trigger signal could indicate either the generation of the signal upon meeting the triggering conditions or the absence of the signal when the conditions are not met. These two detecting outcomes can represent the relative position or size relationship between the cleaning robot and the window to be cleaned, thereby indirectly reflecting the compatibility between the specifications of the window to be cleaned and the working path of the cleaning robot. Consequently, based on the specifications of the window to be cleaned, the working path of the cleaning robot on that window can be determined, ensuring that the robot can navigate and clean the window effectively. It is understood in this embodiment that the working path of the cleaning robot can also be referred to as a window wiping path, walking path, or cleaning path.

It can be understood that the window wiping path of the cleaning robot could be a horizontal sweeping path, which is a Z-shaped path for cleaning the window, or a vertical sweeping path, which is an N-shaped path for cleaning the window.

In the embodiments of this application, in response to the cleaning command for the cleaning robot, the robot is controlled to rotate based on the target rotation direction. During the rotation, it is detected whether a first edge corner trigger signal is generated, and finally, the window wiping path of the cleaning robot is determined based on the detecting results. Since whether a first edge corner trigger signal is generated can reflect the size specifications of the window to be cleaned, this application automatically determines the window wiping path based on the detecting results of the first edge corner trigger signal. Compared to the existing technology, which relies on manual selection of the window wiping path, this approach ensures compatibility between the wiping path and the window to be cleaned, guarantees the normal operation of the cleaning robot, improves the working efficiency and cleaning effect of the cleaning robot, and enhances the reliability of the cleaning robot.

In some embodiments of this application, before controlling the cleaning robot to rotate based on the target rotation direction, the method for determining the wiping path may also include controlling the cleaning robot to return to its correct orientation, so that the robot rotates from its current orientation to a first preset orientation.

It is understandable that, before using the cleaning robot, a preset orientation can be configured for it. After the cleaning robot is placed on the window to be cleaned, it can first be controlled to rotate so that the robot turns to this first preset orientation. Then, subsequent cleaning actions are based on this first preset orientation; and when the cleaning robot finishes the current cleaning, it can also be controlled to rotate to the first preset orientation, so that it returns to the initial state before starting the cleaning.

In the embodiments of this application, the side where the cleaning robot's head is located serves as the reference surface, and the orientation or direction of the cleaning robot's head is considered the orientation or direction of the cleaning robot. The first preset orientation can be set to the vertical upward direction. Thus, controlling the cleaning robot to rotate back to correct orientation means making the head of the cleaning robot rotate from its current orientation to the vertical upward direction.

It is noteworthy that in some application scenarios, a side or the tail of the cleaning robot can also be used as the reference surface to determine a reference direction. For example, if the surface where the cleaning robot's tail is located is used as the benchmark, then the orientation or direction of the cleaning robot's tail can represent the orientation or direction of the cleaning robot.

Additionally, in other application scenarios, the first preset orientation of the cleaning robot can also be horizontal to the left, horizontal to the right, or vertical downward, among others. The choice of the first preset orientation can be selected based on the actual application scenario, without specific limitations here.

After the cleaning robot has rotated back to its correct orientation, it can be controlled to rotate again based on the target rotation direction. Specifically, after the robot has returned to its correct orientation with its head upwards, the target rotation direction can be either to the left or to the right, which can be chosen according to the actual application scenario.

For instance, if the target rotation direction is to the left, the cleaning robot can be controlled to rotate left from the upright position. If the target rotation direction is to the right, the robot can be controlled to rotate right from the upright position.

In some embodiments of this application, before controlling the cleaning robot to rotate based on the target rotation direction, the method for determining the window wiping path can include: obtaining the initial orientation of the cleaning robot on the window to be cleaned; determining the target rotation direction based on the initial orientation.

It is understandable that the initial orientation in the embodiments of this application can be the orientation of the cleaning robot when it is placed on the window to be cleaned, its orientation after movement, or the final orientation of the cleaning robot at the end of the last use. The condition of the initial orientation can be determined according to the actual application scenario, without specific limitations here.

In the embodiments of this application, the initial orientation of the cleaning robot can be obtained through a combination of one or more types of existing motion sensors, such as triaxial gyroscope sensors, triaxial accelerometer sensors, or triaxial electronic compasses, among others.

After acquiring the initial orientation of the cleaning robot, the target rotation direction of the robot can be determined based on this initial orientation. Specifically, since the cleaning robot needs to rotate to change the orientation of its head when cleaning windows using a horizontal sweeping path, using a horizontal sweeping path on narrower windows may prevent the robot from rotating to change the orientation of its head. Therefore, before starting work, the cleaning robot can first determine the width of the window to be cleaned to understand whether the width allows for the robot to rotate on it.

Based on this, in the embodiments of this application, the target rotation direction of the cleaning robot can be determined based on the initial orientation, indirectly inferring the specifications of the window to be cleaned through the robot's rotation based on the target rotation direction.

In some application scenarios, after determining the initial orientation, the cleaning robot's posture can be adjusted to return to a corrected state. For example, using the side where the robot's head is located as the reference surface, the corrected state can refer to the robot's head being in a vertical upward position. Regardless of the robot's initial orientation, before starting work, the robot's head will return to a vertical upward position. At this point, with the head in a vertical upward position as the initial orientation, the target rotation direction can be a preset default direction or a specified rotation direction included in the cleaning command. Specifically, the target rotation direction can be either to the left or to the right, meaning the cleaning robot can rotate left or right to indirectly infer the specifications of the window to be cleaned.

It is understandable that since the cleaning robot's initial orientation can vary widely, including vertical upward, diagonally upward to the left, horizontally to the right, etc., and the target rotation direction is the direction of rotation on the window to be cleaned, therefore, the target rotation direction can be either to the left or to the right. This target rotation direction can be in the same direction as or opposite to the initial orientation.

For instance, if the initial orientation of the cleaning robot is with its head diagonally upwards to the left, then the target rotation direction can be the same as the initial orientation, i.e., rotating to the left, or it can be opposite to the initial orientation, i.e., rotating to the right. Similarly, if the initial orientation of the cleaning robot is with its head horizontally to the right, the target rotation direction can also be to rotate to the right or to rotate to the left.

In some embodiments of this application, obtaining the initial orientation of the cleaning robot on the window to be cleaned can further include: acquiring the posture signal of the cleaning robot; and based on the posture signal, determining the initial orientation of the cleaning robot on the window to be cleaned.

It is understandable that the cleaning robot can be equipped with posture sensors, motion sensors, and other posture detection devices. These posture detection devices can generate a posture signal that represents the change in posture based on the changes in the robot's posture. The processor of the cleaning robot can then calculate the orientation information represented by this posture signal, thus obtaining the initial orientation of the cleaning robot on the window to be cleaned.

In a specific implementation, the cleaning robot can be equipped with a triaxial accelerometer. After the cleaning robot is attached to the window to be cleaned, this triaxial accelerometer can detect the acceleration values of the cleaning robot on the X, Y, and Z axes. Since triaxial accelerometers mostly operate on principles such as piezoresistive, piezoelectric, and capacitive mechanisms, the acceleration values generated on the three axes are proportional to changes in resistance, voltage, and capacitance. Through corresponding amplification circuits and filter circuits, changes in resistance, voltage, and capacitance are collected to generate a posture signal output to the processor. The processor can then analyze these changes to determine the initial orientation of the cleaning robot.

In another specific implementation, the cleaning robot can also be equipped with three single-axis accelerometer sensors, each designated to detect acceleration values in three mutually perpendicular directions in space. The method and process for processing the acceleration values from the three single-axis accelerometers are similar to those for a triaxial accelerometer, and are not elaborated further here.

In some embodiments of this application, controlling the cleaning robot to rotate based on the target rotation direction can involve rotating the robot by a preset angle. For instance, this preset angle can be set to 45 degrees. For example, if the cleaning robot is corrected to a vertical upward orientation, it can be controlled to rotate 45 degrees to the left from its current orientation. During the rotation, the first edge corner trigger signal is detected.

In some embodiments of this application, determining the target rotation direction of the cleaning robot based on its initial orientation can further include: if the angle between the initial orientation and a preset direction is less than a preset angle, then the target rotation direction is determined to be the same as the initial orientation; otherwise, the target rotation direction is determined to be opposite to the initial orientation.

It is understandable that the initial orientation of the cleaning robot can be any orientation, hence the angle between the initial orientation and the preset direction can range from 0° to 180°. Since the robot rotates based on its center point, and the maximum range during rotation is the length of the robot's body diagonal, when the angle between the initial orientation and the preset direction is less than the preset angle, it can be determined that the target rotation direction is the same as the initial orientation. The cleaning robot is controlled to rotate around its center point based on the target rotation direction until the angle between the robot's current orientation and the preset direction is greater than the preset angle. At this point, it can be determined that the robot has rotated through the maximum length required for turning. Conversely, when the angle between the initial orientation and the preset direction is greater than the preset angle, it can be determined that the target rotation direction is opposite to the initial orientation. The cleaning robot is controlled to rotate around its center point based on the target rotation direction until the angle between the robot's current orientation and the preset direction is less than the preset angle. At this time, it can also be determined that the robot has rotated through the maximum length required for turning.

Figure 2:
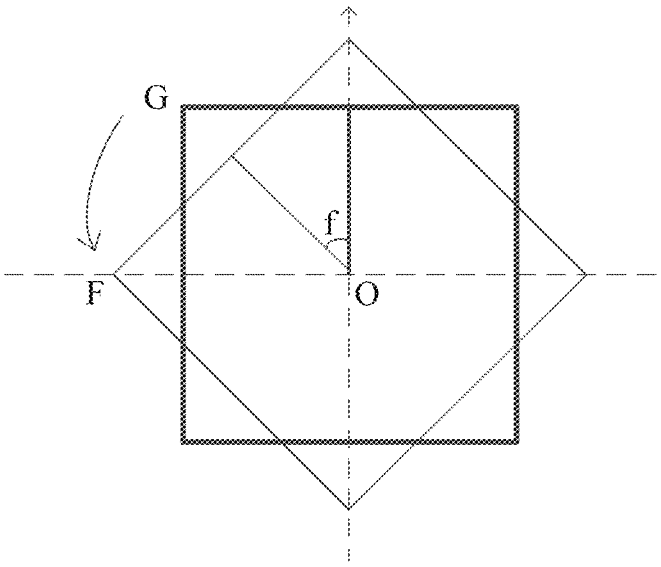
FIG. 2 is a schematic diagram showing a posture change of the cleaning robot rotating based on a target rotation direction, provided in an embodiment of this application.

As shown in FIG. 2, FIG. 2 is a schematic diagram of the posture change of a cleaning robot rotating based on the target rotation direction provided in the embodiments of this application. For a cleaning robot with an initial orientation vertically upward, assuming the preset direction is vertically upward, its initial orientation is in the same direction as the preset direction. At this time, the preset angle can be set to 45°, and the target rotation direction is to rotate to the left. Then, in a specific implementation, the cleaning robot rotates from state G to state F, that is, controlling the cleaning robot to rotate 45° to the left around its own center point O. At state F, the angle f between the cleaning robot and the preset direction, i.e., the vertically upward direction, is 45°. Whether the width of the window to be cleaned is sufficient for the cleaning robot to rotate and change direction can be determined by whether there is a first edge corner trigger signal during the rotation process.

In another specific implementation, the cleaning robot can also be controlled to rotate 45° to the right around its own center point, and similarly, whether the width of the window to be cleaned is sufficient for the cleaning robot to rotate and change direction can be determined by the first edge corner trigger signal during the rotation process.

Figure 3:
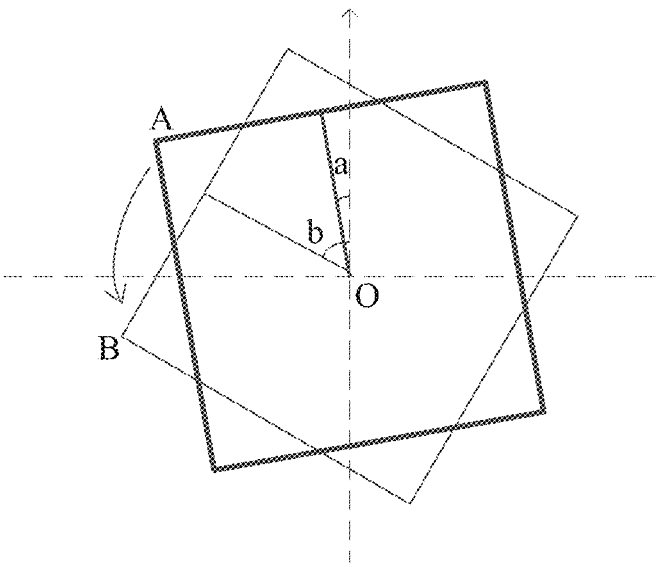
FIG. 3 is another schematic diagram showing a posture change of the cleaning robot rotating based on a target rotation direction, provided in an embodiment of this application.

As shown in FIG. 3, FIG. 3 is another schematic diagram of the posture change of a cleaning robot rotating based on the target rotation direction provided in the embodiments of this application. In FIG. 3, the cleaning robot rotates from state A to state B. For example, the preset direction is set to the vertically upward direction, and the preset angle is set to 45°. At state A, the initial orientation of the cleaning robot's head is to the left. At this time, the angle a between this initial orientation and the preset direction, i.e., the vertically upward direction, is less than the preset angle of 45°. It can be determined that the target rotation direction is the same as the initial orientation. Therefore, the cleaning robot can be controlled to rotate to the left around its own center point O to state B. At this time, the angle b between the orientation of the cleaning robot's head and the vertically upward direction is greater than 45°. Since the cleaning robot's body diagonal passes through the width of the window to be cleaned when rotating from state A to state B, whether the width of the window to be cleaned is sufficient for the cleaning robot to rotate and change direction can also be determined by the first edge corner trigger signal during the rotation process.

Figure 4:
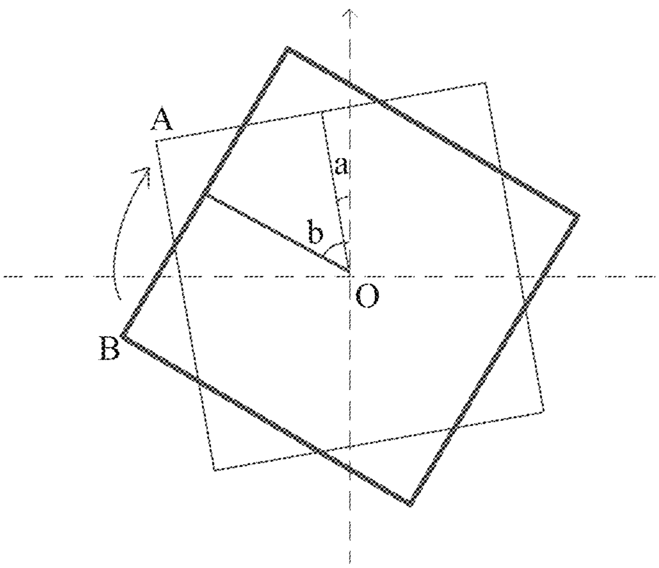
FIG. 4 is yet another schematic diagram showing a posture change of the cleaning robot rotating based on a target rotation direction, provided in an embodiment of this application.

As shown in FIG. 4, FIG. 4 is another schematic diagram of the posture change of a cleaning robot rotating based on the target rotation direction provided in the embodiments of this application. In FIG. 4, the cleaning robot rotates from state B to state A. At state B, the initial orientation of the cleaning robot's head is to the left. At this time, the angle b between this initial orientation and the preset direction is greater than 45°. It can be determined that the target rotation direction is opposite to the initial orientation. Therefore, the cleaning robot can be controlled to rotate to the right around its own center point O to state A. At this time, the angle a between the orientation of the cleaning robot's head and the preset direction is less than 45°. Since the cleaning robot's body diagonal passes through the width of the window to be cleaned when rotating from state B to state A, whether the width of the window to be cleaned is sufficient for the cleaning robot to rotate and change direction can also be determined by the first edge corner trigger signal during the rotation process.

If the initial orientation of the cleaning robot's head is to the left, and the angle between it and the preset direction is 45°, then at this time, the body diagonal of the cleaning robot is precisely in a horizontal position, i.e., it can be directly determined that the width of the window to be cleaned is sufficient to accommodate the cleaning robot rotating and changing direction during the horizontal sweeping path.

Figure 5:
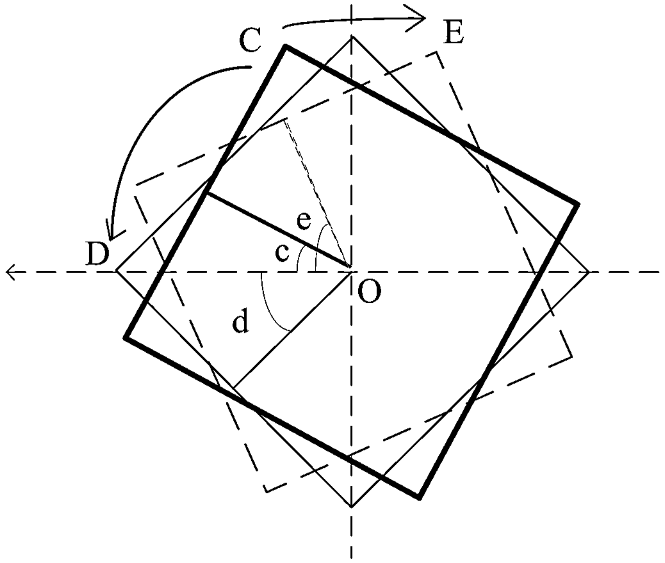
FIG. 5 is a further schematic diagram showing a posture change of the cleaning robot rotating based on a target rotation direction, provided in an embodiment of this application.

As shown in FIG. 5, FIG. 5 is another schematic diagram of the posture change of a cleaning robot rotating based on the target rotation direction provided in the embodiments of this application. In FIG. 5, the cleaning robot rotates from state C to state D. For example, the preset direction is set to the horizontal left direction, and the preset angle is also set to 45°. At state C, the initial orientation of the cleaning robot's head is to the left. At this time, the angle c between this initial orientation and the preset direction, i.e., the horizontal left direction, is less than the preset angle of 45°. It can be determined that the target rotation direction is the same as the initial orientation. Therefore, the cleaning robot can be controlled to rotate to the left around its own center point O to state D. At this time, the angle d between the orientation of the cleaning robot's head and the horizontal left direction is 45°. Since the cleaning robot's body diagonal just turns parallel to the width direction of the window to be cleaned when rotating from state C to state D, whether the width of the window to be cleaned is sufficient for the cleaning robot to rotate and change direction can be determined by the first edge corner trigger signal during the rotation process.

Please refer to FIG. 5 for further information. In some application scenarios, the target rotation direction can also be opposite to the initial orientation. In FIG. 5, at state C, the initial orientation of the cleaning robot's head is to the left. At this time, the angle c between this initial orientation and the preset direction, i.e., the horizontal left direction, is less than the preset angle of 45°. It can be determined that the target rotation direction is opposite to the initial orientation. Therefore, the cleaning robot can be controlled to rotate to the right around its own center point O to state E. At this time, the angle e between the orientation of the cleaning robot's head and the horizontal left direction is greater than 45°. Since the cleaning robot's body diagonal passes through the width of the window to be cleaned when rotating from state C to state E, whether the width of the window to be cleaned is sufficient for the cleaning robot to rotate and change direction can also be determined by the first edge corner trigger signal during the rotation process.

It can be understood that the preset angle can also be other values besides 45°, as long as during the rotation process, the cleaning robot's body diagonal passes through the width of the window to be cleaned, whether the width of the window to be cleaned is sufficient for the cleaning robot to rotate and change direction can be determined by whether there is a first edge corner trigger signal during the rotation process.

In some embodiments of this application, detecting whether a cleaning robot generates a first edge corner trigger signal during its rotation process can further include:

If, during the rotation, the cleaning robot is exposed by the edge of the window to be cleaned or touches the frame of the window to be cleaned, then it is detected that the cleaning robot generates a first edge corner trigger signal; otherwise, it is detected that the cleaning robot does not generate a first edge corner trigger signal.

Figure 6:
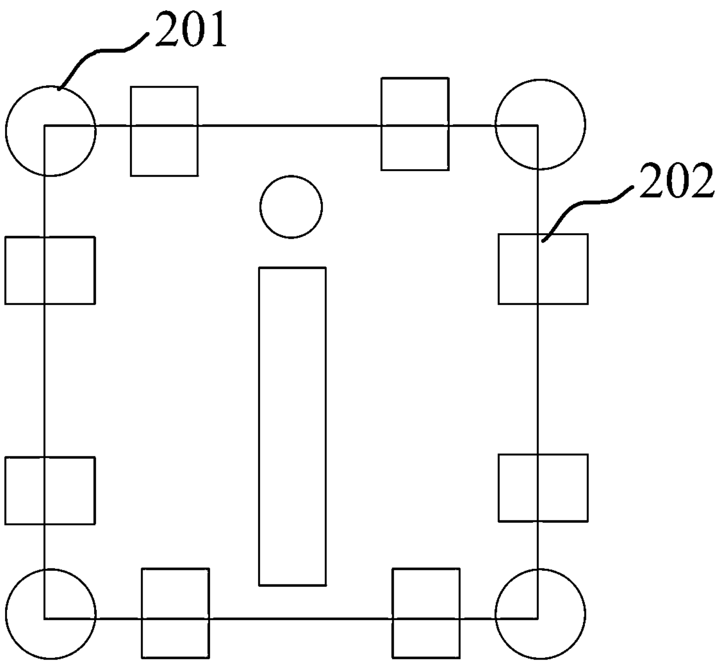
FIG. 6 is a schematic diagram of a cleaning robot's structure provided in an embodiment of this application.

As shown in FIG. 6, FIG. 6 is a schematic diagram of the structure of a cleaning robot provided in the embodiments of this application. In a specific implementation, a ball head sensor 201 can be set on each of the four corners, i.e., the four vertices of the cleaning robot, and two bumper button sensors 202 can be set on each of the four sides of the cleaning robot, with each bumper button sensor 202 being close to the ball head sensor 201 on the adjacent vertices. It should be noted that, considering cost issues in actual production and the accuracy of detection, this embodiment preferably includes four ball head sensors 201 and eight bumper button sensors 202. In other application scenarios, the cleaning robot can also be equipped with more or fewer detectors than shown in FIG. 6.

When the window to be cleaned is a framed window, if a side of the cleaning robot touches the frame of the window to be cleaned, the corresponding bumper button sensor 202 on that side will be pressed due to the collision and trigger, thereby emitting a corresponding first edge corner trigger signal; if the bumper button sensor 202 does not touch the frame of the window to be cleaned, then the bumper button sensor 202 will not generate a first edge corner trigger signal.

When the window to be cleaned is a frameless window, if a ball head sensor 201 at a vertex of the cleaning robot is exposed by the edge of the window to be cleaned, then the ball head sensor 201 will pop out, causing the level signal of that ball head sensor 201 to change. This change will generate a corresponding first edge corner trigger signal.

For example, if the ball head sensor 201 generates a low-level signal while rolling along with the movement of the cleaning robot on the window to be cleaned, and when the upper left vertex of the cleaning robot is exposed by the edge of the window to be cleaned, the ball head sensor 201 at that upper left vertex will pop out due to the absence of pressure from the window to be cleaned. At this time, the level of the ball head sensor 201 changes from a low-level signal to a high-level signal. The rising edge when changing from a low-level signal to a high-level signal can generate a first edge corner trigger signal, which is used to characterize the exposure of the upper left vertex of the cleaning robot by the edge of the window to be cleaned.

In some embodiments of this application, determining the window cleaning path of the cleaning robot on the window to be cleaned based on the detecting results of the first edge corner trigger signal can further include:

If no first edge corner trigger signal is detected, then it is determined that the window cleaning path of the cleaning robot on the window to be cleaned is a horizontal sweeping path. If a first edge corner trigger signal is detected, then control the cleaning robot to move based on a preset motion trajectory according to the positioning of the first edge corner trigger signal, while simultaneously detecting whether a second edge corner trigger signal is generated during the movement of the cleaning robot. Based on the detecting results of the second edge corner trigger signal, determine the window cleaning path of the cleaning robot on the window to be cleaned.

It can be understood that if neither the ball head sensor 201 nor the bumper button sensor 202 in the above embodiments is triggered, then it can be determined based on the Pythagorean theorem that the width of the window to be cleaned is greater than L/sin 45°, where L is the length of the cleaning robot's body. For example, if the length L of the cleaning robot's body is 27 cm, then the width of the window to be cleaned is greater than 38 cm. If the width of the window to be cleaned is sufficient for the cleaning robot to rotate and change direction, then it can be determined that the cleaning path at this time is a horizontal sweeping path, that is, a Z-shaped sweeping path.

However, if one or more of the ball head sensor 201 or the bumper button sensor 202 in the aforementioned embodiments is triggered, then a first edge corner trigger signal can be detected. At this time, the specific triggered ball head sensor 201 or bumper button sensor 202 can be determined based on the positioning of the first edge corner trigger signal, thus controlling the cleaning robot to move based on a preset motion trajectory to further confirm the relative size relationship between the window to be cleaned and the cleaning robot.

Therefore, further in a particular application scenario, controlling the cleaning robot to move based on a preset motion trajectory according to the positioning of the first edge corner trigger signal and simultaneously detecting whether a second edge corner trigger signal is generated during the movement of the cleaning robot. Based on the detecting results of the second edge corner trigger signal, determining the window working path of the cleaning robot on the window to be cleaned can further include:

If the positioning of the first edge corner trigger signal is at the head of the cleaning robot, then control the cleaning robot to move vertically downward a preset first distance on the window to be cleaned. If a second edge corner trigger signal is detected during the movement, it is determined that the cleaning robot cannot rotate on the window to be cleaned and thus cannot operate, triggering the emission of corresponding alarm information.

Continuing to refer to FIGS. 3 and 6, in this embodiment, if the bumper button sensor 202 or ball head 201 located on the right side of the cleaning robot's head is triggered while the cleaning robot rotates in the target rotation direction, it indicates that the cleaning robot has encountered the upper frame of the window to be cleaned or exposed the upper edge of the window to be cleaned. At this time, the cleaning robot can be controlled to move vertically downward a preset first distance on the window to be cleaned before rotating in the target rotation direction again. In this embodiment, the preset first distance can be 12 cm, 15 cm, or 18 cm, etc., which can be selected based on the actual application scenario, specifically determined based on empirical values or by referencing the length of the cleaning robot's body.

If a second edge corner trigger signal is detected during the cleaning robot's vertical downward movement for the preset first distance, which could be a signal emitted due to the triggering of the bumper button sensor 202 or ball head sensor 201 located at the tail of the cleaning robot, it may indicate that during its vertical downward movement, the cleaning robot has encountered the lower frame of the window to be cleaned or exposed the lower edge of the window to be cleaned. This suggests that the height of the window to be cleaned is very low, and at this time, the upward orientation of the cleaning robot's head prevents it from rotating, rendering the cleaning robot unable to perform cleaning tasks. At this point, devices such as buzzers or alarm indicator lights on the cleaning robot can be controlled to emit corresponding alarm information.

If no second edge corner trigger signal is detected during the cleaning robot's vertical downward movement for the preset first distance, the cleaning robot can be controlled to rotate a preset angle in both the target rotation direction and the opposite direction of the target rotation direction, and detect whether a fourth corner trigger signal is generated during the two rotations. If a fourth corner trigger signal is detected during both rotations, it is determined that the cleaning path of the cleaning robot on the window to be cleaned is a vertical sweeping path; otherwise, it is determined that the cleaning path of the cleaning robot on the window to be cleaned is a horizontal sweeping path.

Specifically, with the preset angle set to 45°, the cleaning robot can be controlled to rotate 45° to the left and 45° to the right. If the cleaning robot detects the fourth corner trigger signal during both the right and left rotations, it indicates that during the two rotation processes, the sides of the cleaning robot have collided with the frame of the window to be cleaned. Therefore, this indicates that the window to be cleaned has a narrow width. Since the cleaning robot cannot rotate on such a window, it can be determined that the window cleaning path of the cleaning robot is a vertical sweeping path. Conversely, if the cleaning robot only detects the fourth corner trigger signal once or does not detect it at all during the right and left rotations, it means that during the two rotation processes, only one side of the cleaning robot has collided with the frame of the window to be cleaned, or no collision occurred at all. Thus, it can be determined that the window cleaning path of the cleaning robot is a horizontal sweeping path.

In some embodiments of this application, controlling the cleaning robot to move based on a preset motion trajectory according to the positioning of the first edge corner trigger signal and simultaneously detecting whether a second edge corner trigger signal is generated during the movement. Based on the detecting results of the second edge corner trigger signal, determining the window working path of the cleaning robot on the window to be cleaned can further include:

If the positioning of the first edge corner trigger signal is on one side of the cleaning robot, indicating that the cleaning robot has collided with the left or right frame of the window, then control the cleaning robot to move vertically downward a preset second distance on the window to be cleaned, or after colliding with the lower frame of the window to be cleaned, rotate around its own center point in the opposite direction of the target rotation direction, or rotate around its own center point in the opposite direction of the target rotation direction and move until the angle between the current orientation of the cleaning robot and the vertical downward direction is greater than a preset angle threshold;

If no second edge corner trigger signal is detected during the movement, then it is determined that the window cleaning path of the cleaning robot on the window to be cleaned is a horizontal sweeping path;

If a second edge corner trigger signal is detected during the movement, and the positioning of this second edge corner trigger signal is on another side of the cleaning robot, then it is determined that the window cleaning path of the cleaning robot on the window to be cleaned is a vertical sweeping path.

In this embodiment, if the bumper button sensor 202 or ball head sensor 201 located on the upper side of the cleaning robot's left side is triggered while the cleaning robot rotates in the target rotation direction, such as to the left, it indicates that the cleaning robot has encountered the left frame of the window to be cleaned or exposed the left edge of the window to be cleaned. The cleaning robot is in a position close to the left frame or edge of the window to be cleaned. At this time, it is necessary to detect the right frame or edge of the window to be cleaned. If it is detected that the cleaning robot is close to both the left frame/edge and the right frame/edge of the window to be cleaned, it can be determined that the width of the window to be cleaned is narrow.

Since it has already been detected that the cleaning robot is close to the left frame of the window to be cleaned, continuing to detect the right frame using a rotation around the center point would be hindered by the presence of the left frame, preventing further rotation. Therefore, at this time, the cleaning robot can be controlled to move vertically downward a preset second distance on the window to be cleaned, then rotate around its own center point in the opposite direction of the target rotation direction, or rotate around its own center point in the opposite direction of the target rotation direction and move forward, until the angle between the current orientation of the cleaning robot's head and the preset direction is greater than a preset angle threshold. In this embodiment, the preset second distance can be the same as or different from the preset first distance, and can also be selected based on the actual application scenario, specifically determined based on empirical values or by referencing the length of the cleaning robot's body.

Figure 7:
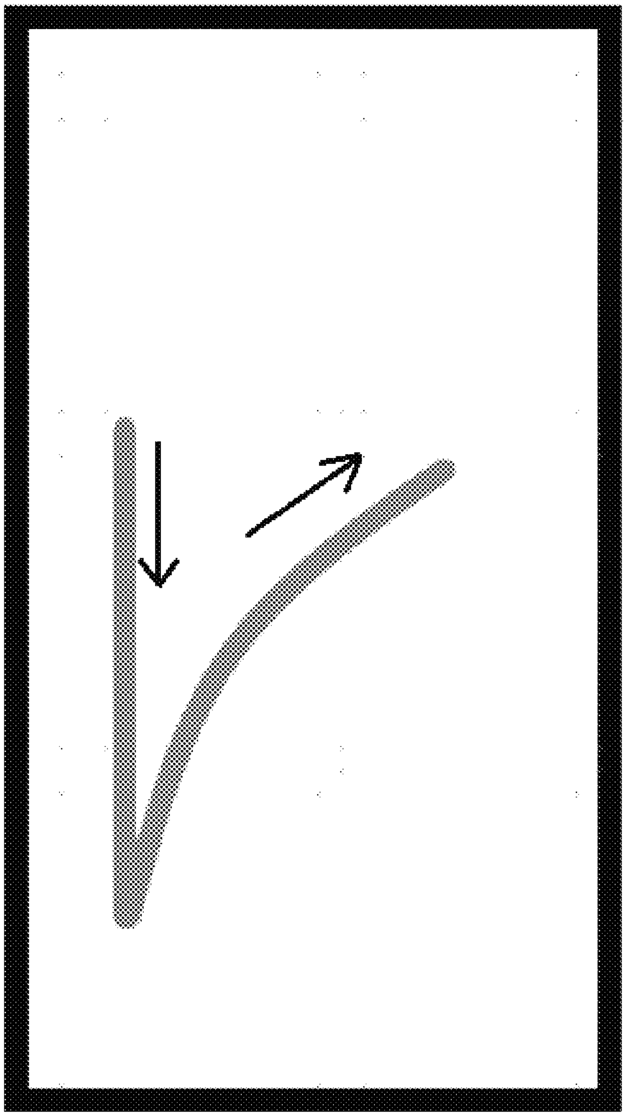
FIG. 7 is a schematic diagram showing a movement trajectory of the cleaning robot provided in an embodiment of this application.

Combining FIGS. 3 and 6 and referring to FIG. 7, which is a schematic diagram of a cleaning robot's motion trajectory provided in the embodiments of this application, FIG. 7 shows that when the cleaning robot triggers the bumper button sensor 202 or ball head sensor 201 on the upper side of its left side while rotating in the target rotation direction, the cleaning robot can be controlled to move vertically downward a preset second distance on the window to be cleaned. Then, the cleaning robot can be controlled to rotate around its own center point in the opposite direction of the target rotation direction and move forward, i.e., rotate around its own center point in the opposite direction of the target rotation direction while also moving forward, until the angle between the current orientation of the cleaning robot's head and the direction of vertical downward movement is greater than a preset angle threshold, such as 45°.

If, during the aforementioned motion process, the second edge corner trigger signal is not detected, it can be determined that the cleaning robot is only positioned near the left frame or left edge of the window to be cleaned at the starting location, and the width of the window to be cleaned is sufficient for the cleaning robot to rotate and change direction. At this time, it can be determined that the cleaning path of the cleaning robot on the window to be cleaned is a horizontal sweeping path.

Conversely, if the second edge corner trigger signal is detected during the aforementioned motion process, and the positioning of this second edge corner trigger signal is on another side of the cleaning robot, that is, when the cleaning robot rotates in the opposite direction of the target rotation direction around its own center point and moves forward at the same time, if it comes into contact with the bumper key sensor 202 on the right side or exposes the spherical head sensor 201 at the right upper corner, this indicates that the width of the window to be cleaned is narrow, and the cleaning robot may not be able to rotate and change direction on it. At this time, it can be determined that the cleaning path of the cleaning robot on the window to be cleaned is a vertical sweeping path, to improve the cleaning efficiency of the cleaning robot on the window to be cleaned.

It is understandable that after detecting the first edge corner trigger signal and before controlling the cleaning robot to move vertically downward a preset first distance or a preset second distance on the window to be cleaned, the rotating cleaning robot can first be realigned. Here, realignment means returning the head of the cleaning robot to a preset orientation, for example, if the preset orientation is upwards, then realignment is controlling the robot to rotate so that its head faces upwards. It is worth noting that in some application scenarios, the cleaning robot can also be controlled to move vertically downward a preset first distance or a preset second distance on the window to be cleaned without realignment. Whether to realign before moving can be set according to the actual application scenario, which is not specifically limited here.

Figure 8:
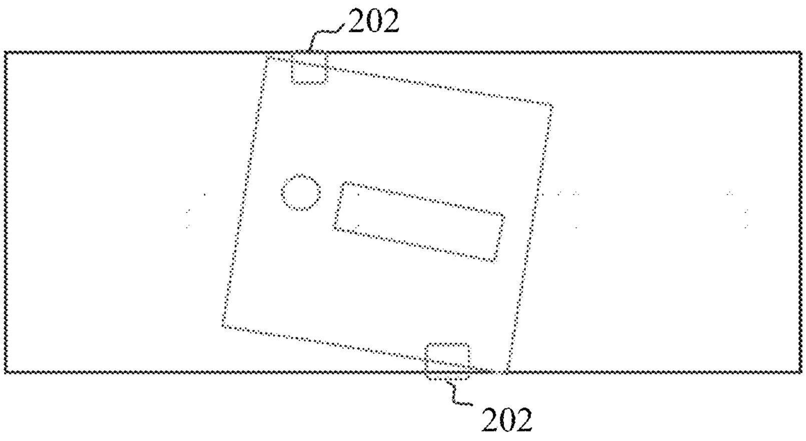
FIG. 8 is a schematic diagram showing the positional relationship when both sides of the cleaning robot are triggered, provided in an embodiment of this application.

As shown in FIG. 8, FIG. 8 is a schematic diagram of the positional relationship when both sides of the cleaning robot provided in an embodiment of this application are triggered. In some embodiments of this application, the method for determining the cleaning path of the cleaning robot on the window to be cleaned may further include:

Controlling the cleaning robot to rotate from its current orientation to a second preset orientation; detecting whether the cleaning robot generates a third corner trigger signal during its rotation process; and determining the cleaning path of the cleaning robot on the window to be cleaned based on the detecting results of the third corner trigger signal.

Understandably, for windows that are short in stature, users can place the cleaning robot with its head facing the direction of the shorter side, allowing the robot to move back and forth along the direction of the longer side for cleaning. In this case, the second preset orientation can be set as the direction of the longer side.

For example, for a short window whose width is slightly greater than its height, when the cleaning robot is placed on this short window, the initial orientation can be towards the height direction, as the initial orientation of the cleaning robot in FIG. 8 is facing left. At this time, the robot can be rotated to assess the height of the short window, that is, controlling the cleaning robot to rotate from its current initial orientation to the second preset orientation. In this embodiment, the second preset orientation can refer to the direction towards which the head of the cleaning robot is facing, which in the application scenario shown in FIG. 8, means rotating the cleaning robot in place to the right. Then, during this rotation process, it is detected whether the spherical head sensor 201 or the bumper key sensor 202 on the corner of the cleaning robot is triggered to generate a third corner trigger signal. If neither sensor is triggered during the rotation process, it can be determined that the height of the short window to be cleaned is sufficient for the cleaning robot to rotate and realign, and at this time, it can be determined that the cleaning path of the cleaning robot on the short window to be cleaned is a horizontal sweeping path. Moreover, at the start of cleaning, the cleaning robot can first be moved vertically upwards to the top frame of the short window to be cleaned, then rotate its head to the horizontal direction, and then start cleaning based on the horizontal sweeping path.

During the rotation process, if a third-corner trigger signal is detected, and the positioning of the third-corner trigger signal is on both sides of the cleaning robot, such as the lower bumper button sensor 202 on the left side and the upper bumper button sensor 202 on the right side of the cleaning robot shown in FIG. 8 being triggered simultaneously, it indicates that the height of the small window to be cleaned is not sufficient for the cleaning robot to rotate. At this time, it can be determined that the cleaning path of the cleaning robot on the small window to be cleaned is a horizontal sweeping path, and under the current state, the cleaning robot has already approached the upper frame. Therefore, it is not necessary to move the cleaning robot vertically upwards to the upper frame of the small window to be cleaned and then rotate it horizontally for horizontal sweeping. It can directly sweep horizontally along the upper frame, optimizing the cleaning steps for the small window to be cleaned, thereby improving the cleaning efficiency.

Figure 9:
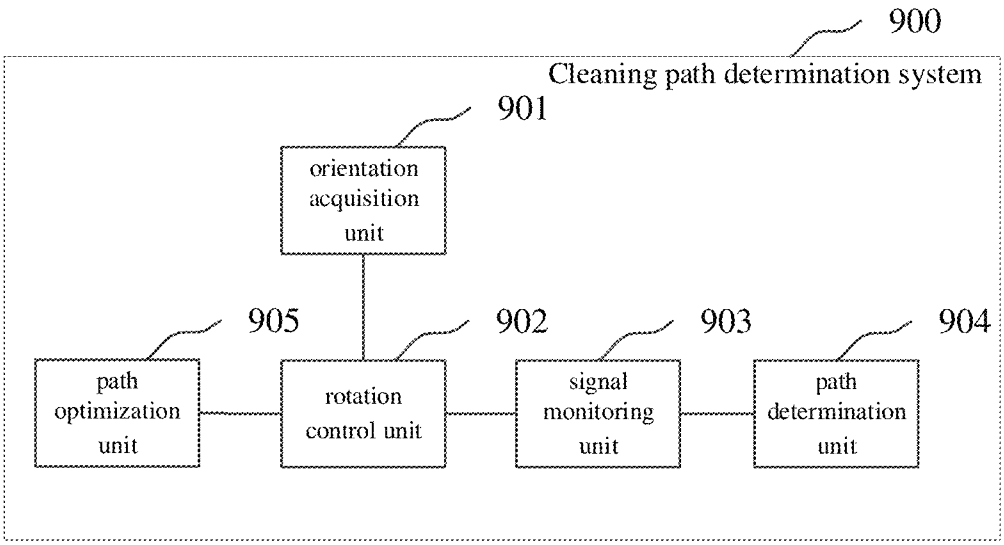
FIG. 9 is a functional module diagram of a cleaning path determination system provided in an embodiment of this application.

To better implement the method of determining the cleaning path in this application, on the basis of the method of determining the cleaning path, this application also provides a system for determining the cleaning path, as shown in FIG. 9. FIG. 9 is a schematic diagram of the functional modules of the cleaning path determination system provided in the embodiment of this application. The cleaning path determination system 900 includes:

A rotation control unit 902, for, in response to the cleaning command of the cleaning robot, controlling the cleaning robot to rotate a preset angle based on the target rotation direction on the surface to be cleaned;

A signal detecting unit 903, for detecting whether the cleaning robot generates a first-corner trigger signal during the rotation process;

A path determination unit 904, for determining the working path of the cleaning robot on the surface to be cleaned based on the detecting results of the first-corner trigger signal.

In the embodiment of this application, the rotation control unit 902 responds to the cleaning command of the cleaning robot, controls the cleaning robot to rotate based on the target rotation direction, and during the rotation process, the signal detecting unit 903 detects whether it generates a first-corner trigger signal. Finally, the path determination unit 904 determines the working path of the cleaning robot based on the detecting results. Since whether the cleaning robot generates a first-corner trigger signal can reflect the size specifications of the surface to be cleaned, therefore, this application automatically determines the working path based on the detecting results of the first-corner trigger signal. Compared to the existing technology, which relies on manually selecting the working path, it ensures the adaptability of the working path to the surface to be cleaned, guarantees the normal operation of the cleaning robot, improves the working efficiency and cleaning effect of the cleaning robot, and enhances the reliability of the cleaning robot.

In some embodiments of this application, the cleaning path determination system 900 also includes an orientation acquisition unit 901. Before the rotation control unit 902 controls the cleaning robot to rotate based on the target rotation direction, the orientation acquisition unit 901 can specifically be used for:

Acquiring the initial orientation of the cleaning robot on the surface to be cleaned;

Determining the target rotation direction based on the initial orientation.

In some embodiments of this application, before the rotation control unit 902 controls the cleaning robot to rotate based on the target rotation direction on the surface to be cleaned, the rotation control unit 902 is also used for:

Controlling the cleaning robot to rotate back to the correct position, making the cleaning robot rotate from the current orientation to a first preset orientation, and using the first preset orientation as the initial orientation of the cleaning robot.

In some embodiments of this application, the orientation acquisition unit 901 can specifically be used for:

Acquiring the posture signal of the cleaning robot;

Obtaining the initial orientation of the cleaning robot on the surface to be cleaned based on the posture signal.

In some embodiments of this application, the signal detecting unit 903 can specifically be used for:

If the cleaning robot, during the rotation process, is exposed by the edge of the surface to be cleaned or touches the frame of the surface to be cleaned, then it is detected that the cleaning robot generates a first-corner trigger signal;

Otherwise, it is detected that the cleaning robot does not generate a first-corner trigger signal.

In some embodiments of this application, the path determination unit 904 can specifically be used for:

If a first-corner trigger signal is not detected, determining the working path of the cleaning robot on the surface to be cleaned as a horizontal sweeping path.

In some embodiments of this application, the path determination unit 904 can also be used for:

If a first-corner trigger signal is detected, controlling the cleaning robot to move based on a preset motion trajectory according to the positioning of the first-corner trigger signal, while also detecting whether the cleaning robot generates a second-corner trigger signal during its movement.

Based on the detecting results of the second-corner trigger signal, determining the working path of the cleaning robot on the surface to be cleaned.

In some embodiments of this application, the path determination unit 904 can specifically be used for:

If the positioning of the first edge trigger signal is at the head of the cleaning robot, then control the cleaning robot to move vertically downward a preset first distance on the surface to be cleaned;

If a second edge trigger signal is detected during the movement, it is determined that the cleaning robot cannot work on the surface to be cleaned, and corresponding alarm information is issued.

In some embodiments of this application, the path determination unit 904 can specifically be used for:

If the positioning of the first edge trigger signal is at the head of the cleaning robot, then control the cleaning robot to move vertically downward a preset first distance on the surface to be cleaned;

If no second edge trigger signal is detected during the movement, then control the cleaning robot to rotate a preset angle based on the target rotation direction and the opposite direction of the target rotation direction, and detect whether a fourth edge trigger signal is generated during the two rotations;

If a fourth edge trigger signal is detected during both rotations, it is determined that the working path of the cleaning robot on the surface to be cleaned is a vertical sweeping path;

Otherwise, it is determined that the working path of the cleaning robot on the surface to be cleaned is a horizontal sweeping path.

In some embodiments of this application, the path determination unit 904 can specifically be used for:

If the positioning of the first edge trigger signal is on one side of the cleaning robot, then control the cleaning robot to move vertically downward a preset second distance on the surface to be cleaned, and then rotate around its own center point in the opposite direction of the target rotation direction, until the angle between the current orientation of the cleaning robot and the direction when moving vertically downward is greater than a preset angle threshold;

If no second edge trigger signal is detected during the movement, it is determined that the working path of the cleaning robot on the surface to be cleaned is a horizontal sweeping path.

In some embodiments of this application, the path determination unit 904 can specifically be used for:

If a second edge trigger signal is detected during the movement, and the positioning of this second edge trigger signal is on another side of the cleaning robot, then it is determined that the working path of the cleaning robot on the surface to be cleaned is a vertical sweeping path.

In some embodiments of this application, the window cleaning path determination system 900 may also include a path optimization unit 905, and before the rotation control unit 902 controls the cleaning robot to rotate on the window to be cleaned based on the target rotation direction, the path optimization unit 905 of the cleaning robot can specifically be used for:

Controlling the cleaning robot to rotate from its current orientation to a second preset orientation;

Detecting whether the cleaning robot generates a third edge trigger signal during its rotation;

Determining the working path of the cleaning robot on the surface to be cleaned based on the detecting results of the third edge trigger signal.

In some embodiments of this application, the path optimization unit 905 can specifically be used for:

If a third edge trigger signal is detected, and the positioning of this third edge trigger signal is on both sides of the cleaning robot, then it is determined that the working path of the cleaning robot on the surface to be cleaned is a horizontal sweeping path.

It should be noted that in this application, the content related to the orientation acquisition unit 901, rotation control unit 902, signal detecting unit 903, path determination unit 904, and path optimization unit 905 correspond one-to-one with the above description. Those skilled in the art can clearly understand that for the sake of convenience and brevity in the description, the specific working process of the window cleaning path determination system and its corresponding unit modules described above can refer to the explanations of the window cleaning path determination methods in any embodiments corresponding to FIGS. 1 to 8, which are not reiterated here in detail.

To better implement the cleaning path determination method of this application, this application also provides a cleaning path determination device, which integrates any one of the cleaning path determination systems 900 provided in this application. This cleaning path determination device can include a processor 1001 and a memory 1002. The memory 1002 can be used to store computer programs, which, when executed by the processor 1001, can be used to implement the following functions:

In response to a cleaning command for the cleaning robot, control the cleaning robot to rotate a preset angle based on the target rotation direction on the surface to be cleaned;

Detect whether the cleaning robot generates a first edge trigger signal during its rotation;

Determine the working path of the cleaning robot on the surface to be cleaned based on the detecting results of the first edge trigger signal.

Figure 10:
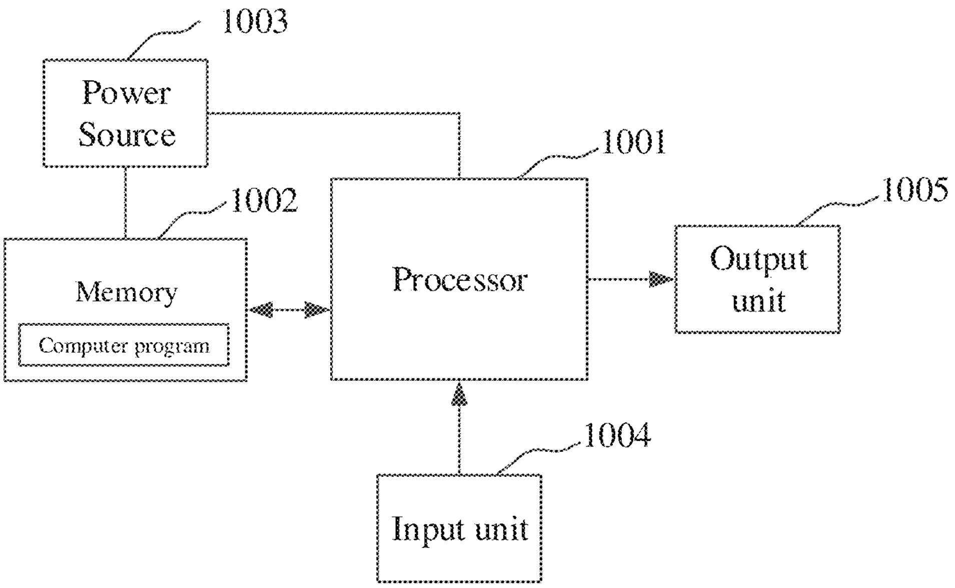
FIG. 10 is a structural schematic diagram of a cleaning path determination device provided in an embodiment of this application.

As shown in FIG. 10, it depicts a schematic diagram of a cleaning path determination device involved in this application, specifically:

The cleaning path determination device may include one or more processing cores of a processor 1001, a memory 1002 comprising one or more computer-readable storage mediums, a power source 1003, an input unit 1004, and other components. Those skilled in the art can understand that the device structure shown in FIG. 10 does not constitute a limitation on the device. The cleaning path determination device can also include more or fewer components than shown, or a combination of certain components, or different arrangements of components. Among them:

The processor 1001 serves as the control center of the device, connecting all parts of the device through various interfaces and circuits. It oversees the entire cleaning path determination device by running or executing software programs and/or unit modules stored in the memory 1002, as well as calling upon data stored in the memory 1002 to perform various functions of the device and process data. Optionally, the processor 1001 can include one or more processing cores; the processor 1001 can be a Central Processing Unit (CPU), as well as other general-purpose processors, Digital Signal Processors (DSP), Application Specific Integrated Circuits (ASIC), Field-Programmable Gate Arrays (FPGA), or other programmable logic devices, discrete gates, or transistor logic devices, discrete hardware components, etc. The general processor can be a microprocessor, or the processor can also be any conventional processor, etc. Preferably, the processor 1001 integrates an application processor and a modem processor, where the application processor mainly handles the operating system, user interface, and applications, etc., while the modem processor mainly handles wireless communication. It is understandable that the aforementioned modem processor can also be not integrated into the processor 1001.

The memory 1002 can be used to store software programs and modules, and the processor 1001 executes various functional applications and data processing by running the software programs and modules stored in the memory 1002. The memory 1002 can mainly include a program storage area and a data storage area, where the program storage area can store the operating system, applications required for at least one function, etc.; the data storage area can store data created based on the cleaning path to determine the use of the device, etc. In addition, the memory 1002 can include high-speed random access memory and can also include non-volatile memory, such as at least one disk storage device, flash memory device, or other volatile solid-state storage device. Accordingly, the memory 1002 can also include a memory controller to provide access to the memory 1002 for the processor 1001.

The device that determines the cleaning path can also include a power supply 1003 that supplies power to various components. Preferably, the power supply 1003 can be logically connected to the processor 1001 through a power management system, thereby achieving functions such as managing charging, discharging, and power consumption management through the power management system. The power supply 1003 can also include any combination of components such as one or more direct current or alternating current sources, a recharging system, a power failure detection circuit, a power converter or inverter, a power status indicator, etc.

The device that determines the cleaning path can also include an input unit 1004 and an output unit 1005. The input unit 1004 can be used to receive digital or character information input and generate keyboard, mouse, joystick, optical or trackball signal inputs related to user settings and functional control.

Although not shown, the device that determines the cleaning path can also include a display unit, etc., which is not elaborated here. Specifically, in this application, the processor 1001 in the device that determines the cleaning path follows the instructions below to load the executable files corresponding to the processes of one or more applications into the memory 1002, and the processor 1001 runs the applications stored in the memory 1002 to implement various functions, as follows:

In response to the cleaning command of the cleaning robot, it controls the cleaning robot to rotate a preset angle based on the target rotation direction on the surface to be cleaned;

During the rotation process of the cleaning robot, it detects whether the cleaning robot generates a first edge corner trigger signal;

Based on the detecting results of the first edge corner trigger signal, it determines the working path of the cleaning robot on the surface to be cleaned.

Those skilled in the art can understand that all or part of the steps in the various methods described above can be completed by instructions, or by controlling related hardware through instructions. These instructions can be stored in a computer-readable storage medium and loaded and executed by the processor 1001.

For this purpose, this application provides a computer-readable storage medium, which can include: Read-Only Memory (ROM), Random Access Memory (RAM), disk, or optical disc, etc. It stores computer instructions, which are loaded by the processor 1001 to execute steps in any of the cleaning path determination methods provided by this application. For example, when the computer instructions are executed by the processor 1001, the following functions are realized:

In response to the cleaning command of the cleaning robot, it controls the cleaning robot to rotate a preset angle based on the target rotation direction on the surface to be cleaned;

During the rotation process of the cleaning robot, it detects whether the cleaning robot generates a first edge corner trigger signal;

Based on the detecting results of the first edge corner trigger signal, it determines the working path of the cleaning robot on the surface to be cleaned.

The computer instructions stored in the computer-readable storage medium can execute the steps in the cleaning path determination method in any embodiment corresponding to FIGS. 1 to 8 of this application, thereby achieving the beneficial effects that can be realized by the cleaning path determination method in any embodiment corresponding to FIGS. 1 to 8 of this application, as detailed in the previous descriptions, which are not repeated here.

In the aforementioned embodiments, each description focuses on different aspects. For parts not detailed in one embodiment, refer to the detailed descriptions of other embodiments provided above, which are not repeated here.

In specific implementations, the various units or structures mentioned can be implemented as independent entities or any combination thereof, as the same or several entities. The specific implementations of these units or structures can refer to the previous embodiments, which are not reiterated here.

The detailed introduction provided above outlines a method, system, device, and storage medium for determining a cleaning path. This document has used specific examples to elucidate the principles and implementation methods of the application. The foregoing descriptions are intended to facilitate an understanding of the application's method and its core idea. At the same time, for those skilled in the art, changes in the specific implementation and application scope can be expected based on the ideas of this application. Therefore, the content of this specification should not be construed as limiting the scope of this application.

The invention claimed is:

1. A method for determining a working path of a cleaning robot, comprising:

controlling the cleaning robot to rotate a preset angle based on a target rotation direction on a surface, wherein the cleaning robot is a window cleaning robot for cleaning a glass surface, a marble media wall, and a tile;

detecting, during the rotation of the cleaning robot, whether the cleaning robot generates a first edge corner trigger signal; and based on the cleaning robot generating the first edge corner trigger signal or not, determining a working path of the cleaning robot on the surface;

wherein, before controlling the cleaning robot to rotate on the surface based on the target rotation direction, the method further comprises:

controlling the cleaning robot to rotate from its current orientation to a second preset orientation;

detecting whether the cleaning robot generates a third edge corner trigger signal during the rotation;

based on the cleaning robot generating the third edge corner trigger signal or not, determining the working path of the cleaning robot on the surface.

2. The method according to claim 1, wherein, before controlling the cleaning robot to rotate based on the target rotation direction, the method comprises:

obtaining an initial orientation of the cleaning robot on the surface;

determining the target rotation direction based on the initial orientation.

3. The method according to claim 2, wherein, before controlling the cleaning robot to rotate based on the target rotation direction, the method comprises:

controlling the cleaning robot to rotate back to a correct position, so that the cleaning robot rotates from a current orientation to a first preset orientation, using the first preset orientation as the initial orientation of the cleaning robot.

4. The method according to claim 2, wherein obtaining the initial orientation of the cleaning robot on the surface comprises:

obtaining a posture signal of the cleaning robot;

based on the posture signal, obtaining the initial orientation of the cleaning robot on the surface.

5. The method according to claim 1, wherein detecting during the rotation of the cleaning robot whether the cleaning robot generates a first edge corner trigger signal comprises:

if the cleaning robot, during rotation, is exposed by an edge of the surface or touches a frame of the surface, then it is detected that the cleaning robot generates the first edge corner trigger signal;

otherwise, it is detected that the cleaning robot does not generate the first edge corner trigger signal.

6. The method according to claim 1, wherein, based on the cleaning robot generating the first edge corner trigger signal or not, determining the working path of the cleaning robot on the surface, comprises:

if the first edge corner trigger signal is detected, controlling the cleaning robot to move based on a preset motion trajectory according to the positioning of the first edge corner trigger signal, and simultaneously detecting whether a second edge corner trigger signal is generated during the movement;

determining the working path of the cleaning robot on the surface based on the cleaning robot generating the second edge corner trigger signal or not.

7. The method according to claim 6, further comprising:

if the positioning of the first edge corner trigger signal is at a head of the cleaning robot, controlling the cleaning robot to move vertically downward a preset first distance on the surface;

if the second edge corner trigger signal is detected during the movement, determining that the cleaning robot cannot work on the surface and issuing a corresponding alarm message.

8. The method according to claim 6, further comprising:

if the positioning of the first edge corner trigger signal is at a head of the cleaning robot, controlling the cleaning robot to move vertically downward a preset first distance on the surface;

if the second edge corner trigger signal is not detected during the movement, controlling the cleaning robot to rotate a preset angle in the target rotation direction and an opposite direction of the target rotation direction, respectively, and detecting whether a fourth edge corner trigger signal is generated during the two rotations;

if the fourth edge corner trigger signal is detected during both rotations, determining that the working path of the cleaning robot on the surface to be a vertical sweeping path;

otherwise, determining that the working path of the cleaning robot on the surface to be a horizontal sweeping path.

9. The method according to claim 6, further comprising:

if the positioning of the first edge corner trigger signal is at one side of the cleaning robot, controlling the cleaning robot to move vertically downward a preset second distance on the surface, then rotate around its own center point in an opposite direction of the target rotation direction or rotate around its own center point in an opposite direction of the target rotation direction and perform a walking movement, until the angle between a current orientation of the cleaning robot and the direction when facing vertically downward exceeds a preset angle threshold;

if the second edge corner trigger signal is not detected during the movement, determining that the working path of the cleaning robot on the surface to a horizontal sweeping path.

10. The method according to claim 9, wherein, determining the working path of the cleaning robot on the surface based on the cleaning robot generating the second edge corner trigger signal or not, comprises:

if the second edge corner trigger signal is detected during the movement, and the positioning of the second edge corner trigger signal is at another side of the cleaning robot, determining that the working path of the cleaning robot on the surface to be a vertical sweeping path.

11. The method according to claim 1, wherein, based on the cleaning robot generating the third edge corner trigger signal or not, determining the working path of the cleaning robot on the surface, comprises:

if the third edge corner trigger signal is detected, and the positioning of the third edge corner trigger signal is at both sides of the cleaning robot, determining that the working path of the cleaning robot on the surface to be a horizontal sweeping path.

12. A cleaning robot comprising:

a robot body;

detectors at corners of the robot body;

a memory and a processor on the robot body, the memory being configured with instructions executable by the processor to perform operations comprising:

controlling the robot body to rotate a preset angle based on a target rotation direction on a surface, wherein the cleaning robot is a window cleaning robot for cleaning a glass surface, a marble media wall, and a tile;

detecting, during the rotation of the robot body, whether any of the detectors generates a first edge corner trigger signal; and based on the cleaning robot generating the first edge corner trigger signal or not, determining a working path of the robot body on the surface;

wherein, before controlling the cleaning robot to rotate on the surface based on the target rotation direction, the processor further performs operations comprising:

controlling the cleaning robot to rotate from its current orientation to a second preset orientation;

detecting whether the cleaning robot generates a third edge corner trigger signal during the rotation;

based on the cleaning robot generating the third edge corner trigger signal or not, determining the working path of the cleaning robot on the surface.

13. The cleaning robot according to claim 12, wherein, the operations further comprise, before controlling the robot body to rotate based on the target rotation direction:

obtaining an initial orientation of the robot body on the surface;

determining the target rotation direction based on the initial orientation.

14. The cleaning robot according to claim 13, wherein, the operations further comprise, before controlling the robot body to rotate based on the target rotation direction:

controlling the robot body to rotate back to a correct position, so that the robot body rotates from a current orientation to a first preset orientation, using the first preset orientation as the initial orientation of the robot body.

15. The cleaning robot according to claim 13, wherein obtaining the initial orientation of the robot body on the surface comprises:

obtaining a posture signal of the robot body;

based on the posture signal, obtaining the initial orientation of the robot body on the surface.

16. The cleaning robot according to claim 12, wherein detecting during the rotation of the robot body whether any of the detectors generates a first edge corner trigger signal comprises:

if the robot body, during rotation, is exposed by an edge of the surface or touches a frame of the surface, then it is detected that one of the detectors generates the first edge corner trigger signal;

otherwise, it is detected no detectors generate the first edge corner trigger signal.

17. The cleaning robot according to claim 12, wherein, based on the cleaning robot generating the first edge corner trigger signal or not, determining the working path of the cleaning robot on the surface, comprises:

if the first edge corner trigger signal is detected, controlling the robot body to move based on a preset motion trajectory according to the positioning of the first edge corner trigger signal, and simultaneously detecting whether a second edge corner trigger signal is generated during the movement;

determining the working path of the cleaning robot on the surface based on the cleaning robot generating the second edge corner trigger signal or not.

* * * * *